United States Patent
Parris et al.

(10) Patent No.: US 7,788,430 B2
(45) Date of Patent: Aug. 31, 2010

(54) ENHANCED SINGLE-NODE PROTOCOL FOR DATA, ADDRESS AND CONTROL OPERATIONS

(75) Inventors: Christopher A. Parris, Casa Grande, AZ (US); Robert S. Green, Tucson, AZ (US); David L. Wilkie, Gilbert, AZ (US); Martin R. Bowman, Gilbert, AZ (US); Alex Martinez, Mesa, AZ (US); Martin S. Kvasnicka, Gilbert, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 558 days.

(21) Appl. No.: 11/855,294

(22) Filed: Sep. 14, 2007

(65) Prior Publication Data

US 2009/0077193 A1    Mar. 19, 2009

(51) Int. Cl.
*G06F 13/00* (2006.01)
(52) U.S. Cl. ....... 710/110; 710/105
(58) Field of Classification Search ....... 710/8, 710/10, 104, 105, 110
See application file for complete search history.

(56) References Cited

U.S. PATENT DOCUMENTS

| 7,589,652 B2 * | 9/2009 | Lee et al. ............ 341/144 |
| 2004/0208200 A1 | 10/2004 | Hejdeman et al. |
| 2007/0133310 A1 * | 6/2007 | Sorrells et al. ........ 365/189.02 |

OTHER PUBLICATIONS

Intl. Search Report and Written Opinion for PCT/US2008/075994, dated Dec. 22, 2008.

* cited by examiner

*Primary Examiner*—Glenn A Auve
(74) *Attorney, Agent, or Firm*—King & Spalding L.L.P.

(57) ABSTRACT

An integrated circuit digital device, acting as a master, communicates with at least one peripheral device, acting as a slave, using an enhanced single-node protocol for data, address and control operation. The peripheral device may be selected from any number of different functions. The peripheral device may be packaged in a low pin count integrated circuit package. At a minimum, the peripheral device integrated circuit package may have a ground terminal, $V_{SS}$; a power terminal, $V_{DD}$ or $V_{CC}$; and a bidirectional serial clock, and data and control input-output (SCIO) terminal. Acknowledgment sequences from both the master and slave devices ensure robust communications therebetween.

28 Claims, 9 Drawing Sheets

ENHANCED SINGLE-NODE PROTOCOL FOR DATA, ADDRESS AND CONTROL OPERATIONS

TECHNICAL FIELD

The present disclosure relates generally to communications between semiconductor devices, e.g., processors, memory, peripherals, sensors, etc., and, more particularly, to semiconductor devices using enhanced single-node protocols for data, address and control operations.

BACKGROUND

Integrated circuit digital devices, e.g., digital processors such as, for example but not limited to, microprocessors, microcontrollers, digital signal processors (DSP), programmable logic array (PLA), application specific integrated circuit (ASIC) and the like, are becoming smaller and with fewer external input-output (I/O) signal connections (e.g., pins or leads) for both cost and space considerations. Typically an integrated circuit device may be in an integrated circuit package having a plurality of external connections. At least two of these external connections must be used for power and ground, e.g., $V_{DD}$ and $V_{SS}$, respectively. The remaining few external connections are left for I/O signals. For example, the Serial Peripheral Interface (SPI) Bus requires four external signal connections, the Universal Serial Bus (USB) requires two external signal connections and also may require two external power connections, the Inter-Integrated Circuit ($I^2C$) requires two external signal connections, and The Controller Area Network (CAN) may use a two wire twisted pair bus.

The integrated circuit devices may benefit from additional device functions, e.g., external memory, high speed interfaces, sensors, peripherals, etc. Memory may be, for example but not limited to, one time programmable (OTP), electrically programmable read only memory (EPROM), electrically erasable and programmable read only memory (EEPROM), FLASH memory, static random access memory (SRAM), dynamic random access memory (DRAM), etc. High speed interfaces may be, for example but not limited to, Ethernet, Universal Serial Bus (USB), Firewire, and the like. Sensors may be used to measure, for example but not limited to, pressure, temperature, humidity, voltage, current, frequency, time, radiation, pH, etc. Peripherals may be used to capture, for example but not limited to, video, audio, radar, infrared, ultrasonic information, etc. Integrated circuit package size for these devices is being more critical from both cost and printed circuit board space requirements.

SUMMARY

Therefore what is needed is a robust data, address and control protocol for communicating between the integrated circuit devices and additional external device functions, wherein this protocol requires a minimum number of signal I/O connections between each connected package. A single-node signal connection may be used to electrically couple the integrated circuit device and any additional device functions together so that the robust data, address and control protocol may be effectively utilized, according to the teachings of this disclosure.

For example, additional external devices (hereinafter "peripherals") may be coupled to an integrated circuit device with a minimum number of connections, e.g., a single-node bus for data, address and control, plus power and ground, e.g., $V_{DD}$ (or $V_{CC}$) and $V_{SS}$, respectively, may be required for operation of the integrated circuit device and peripheral(s), thus a minimum of three external connections (pin, surface mount lead, etc.) of an integrated circuit package, e.g., SOT 23-3, SC70-3, etc., may be used for packaging the integrated circuit device and/or peripheral. Peripheral address selection when implementing a plurality of peripherals may utilize specifically defined device type addressing and/or additional address select connections on a low pin count integrated circuit package, e.g., SOT 23-5, SOT 23-6, MSOP-8, SOIC-8 and the like, and/or by programming a peripheral address for each of the peripherals via the single-node data, address and control bus.

According to a specific example embodiment as described in the present disclosure, an enhanced single-node protocol for data, address and control operations between digital devices may comprise the steps of: providing a master device having a bidirectional serial clock, and data and control input-output (SCIO) terminal; providing at least one slave device having a bidirectional SCIO terminal, wherein the master device SCIO terminal and the at least one slave device SCIO terminal are coupled together; generating a standby pulse from the master device SCIO terminal; generating a start header from the master device SCIO terminal; generating a master acknowledge from the master device SCIO terminal; generating a device address from the master device SCIO terminal; generating the master acknowledge from master device SCIO terminal; generating a slave acknowledge from the slave device SCIO terminal; generating a command from the master device SCIO terminal; generating the master acknowledge from the master device SCIO terminal; generating the slave acknowledge from the slave device SCIO terminal; generating an information byte from the master device SCIO terminal when sending information to the slave device SCIO terminal; generating an information byte from the slave device SCIO terminal when sending information to the master device SCIO terminal; generating a termination master acknowledge from the master device SCIO terminal; and generating the slave acknowledge from the slave device SCIO terminal.

According to another specific example embodiment as described in the present disclosure, an enhanced single-node protocol for data, address and control operations between digital devices, said protocol comprising the steps of: (a) providing a master device having a bidirectional serial clock, and data and control input-output (SCIO) terminal; (b) providing at least one slave device having a bidirectional SCIO terminal, wherein the master device SCIO terminal and the at least one slave device SCIO terminal are coupled together; (c) generating a standby pulse from the master device SCIO terminal; (d) generating a start header from the master device SCIO terminal; (e) generating a master acknowledge from the master device SCIO terminal; (f) generating a one of a plurality of device addresses from the master device SCIO terminal; (g) generating the master acknowledge from master device SCIO terminal; (h) determining whether a slave acknowledge is generated for the one of the plurality of device addresses, wherein if the slave acknowledge is generated then storing the one of the plurality of device addresses in a slave device table; and (i) repeating steps (c) through (h) until every one of the plurality of device addresses have been generated.

BRIEF DESCRIPTION OF THE DRAWINGS

A more complete understanding of the present disclosure thereof may be acquired by referring to the following description taken in conjunction with the accompanying drawing, wherein.

Figure 1:
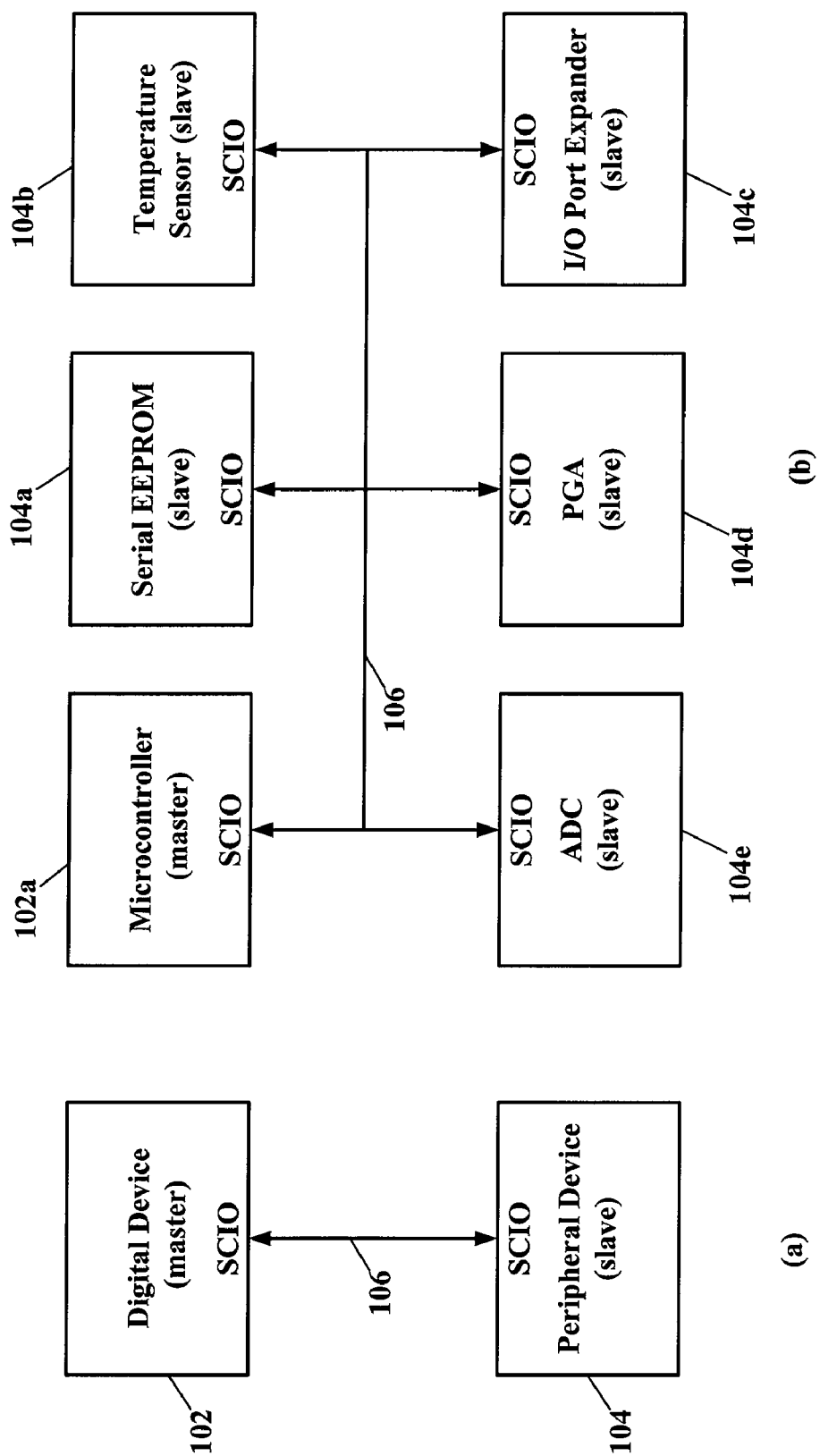
FIG. 1 illustrates a schematic block diagram of an integrated circuit digital device coupled to a peripheral device with a single-node data, address and control bus, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Referring now to FIG. 1, depicted is a schematic block diagram of an digital device coupled to a peripheral device with a single-node data, address and control bus, according to a specific example embodiment of this disclosure. A digital device 102 may be coupled to one or more peripheral devices 104 by a single-node data, address and control bus 106 adapted for a serial clock, and data and control input-output (hereinafter "SCIO"). The digital device 102 may be a digital processor, e.g., microprocessor, a microcontroller, a digital signal processor (DSP), a programmable logic array (PLA), an application specific integrated circuit (ASIC) and the like.

The peripheral device 104 may be serial non-volatile memory, e.g., one time programmable (OTP) memory, electrically programmable read only memory (EPROM), electrically erasable and programmable read only memory (EEPROM), FLASH memory and the like. The peripheral device 104 may also be serial access volatile memory, e.g., static random access memory (SRAM), dynamic random access memory (DRAM) and the like. The peripheral device 104 may also be a sensor or other type of peripheral, e.g., video camera, analog-to-digital converter (ADC), digital-to-analog converter (DAC), digital potentiometer, programmable gain amplifier, input-output (I/O) port expander, process sensor, for example but not limited to, temperature, pressure, vibration, flow rate, pH, etc. The single-node data, address and control bus 106 may be a conductive node, e.g., printed circuit board conductor, integrated circuit die bond node and the like.

The digital device 102 and/or the peripheral device 104 may have, for example but not limited to, an active pull-up (e.g., logic '1'), pull-down (e.g., logic '0') and high impedance third state (tri-state) driver coupled to the single-node data, address and control bus 106. An open collector configuration with a pull-up resistor is also contemplated herein and within the scope of this disclosure. The digital device 102 and the peripheral device 104 may be coupled to a common power supply return, e.g., $V_{SS}$, ground, etc., and power, e.g., $V_{CC}$, $V_{DD}$, etc.

Communications through a single I/O signal between multiple devices over a single node "bussed" system is contemplated herein. According to the teachings of this disclosure, one digital device 102 may be defined as the master, and is responsible for initiating and coordinating all operations with each peripheral (slave) device 104 on the bus 106. Each peripheral device 104 responds to actions initiated by the master digital device 102. The peripheral device 104 may be designed for any number of purposes.

Data may be transferred between the master device and a selected slave device with serial digital binary signals over the bus 106 The signal protocol on the bus 106 may be, for example but not limited to, Manchester-encoding, or any other type of serial signal protocol, e.g., non-return to zero (NRZ), pulse position modulation (PPM), frequency shift keying (FSK), phase shift keying (PSK), amplitude shift keying (ASK) and the like, that may use an initial Start header byte (or other length word) to synchronize the master and slave clocks together.

Single-node data, address and control over the bus 106 is controlled by the master digital device 102 which determines the clock period, controls bus access and initiates all operations, while the peripheral device(s) 104 act as slaves. Both master and slave devices may operate as a transmitter or a receiver, but the master device determines which mode and operation is active.

Figure 2:
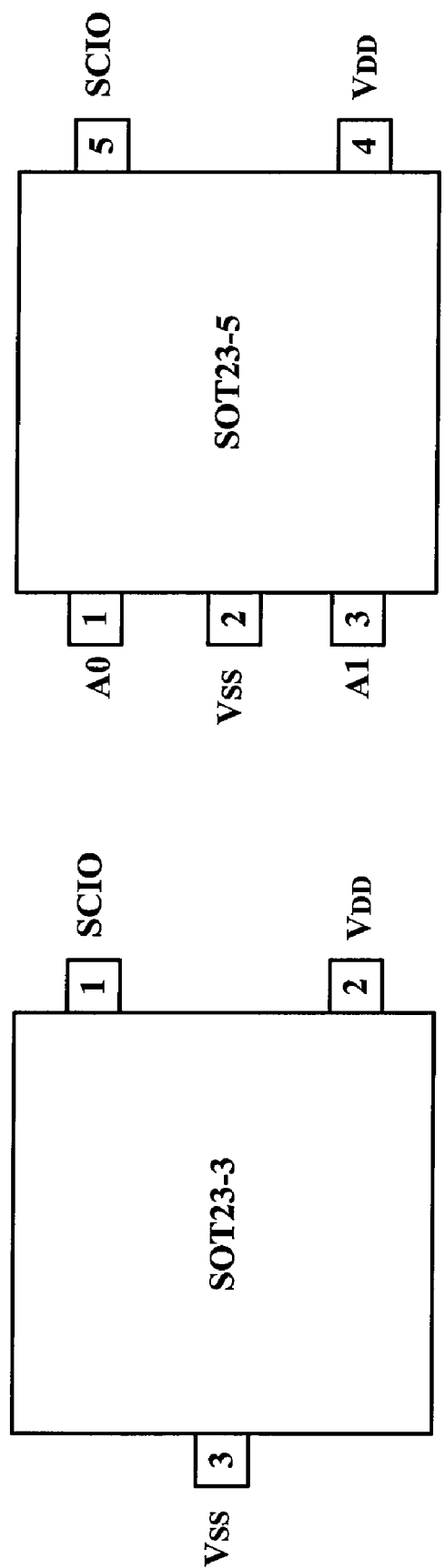
FIG. 2 illustrates schematic plan view diagrams of example low pin count integrated circuit packages, according to a specific example embodiment of this disclosure.

Referring to FIG. 2, depicted are schematic plan view diagrams of example low pin count integrated circuit packages, according to a specific example embodiment of this disclosure. A peripheral device 104 may be packaged in a low pin count integrated circuit package, e.g., SOT23-3, SOT23-5, SC70-3 and the like. It is contemplated and within the scope of this disclosure that any low pin count integrated circuit package may be used to enclose the peripheral device 104. The integrated circuit package may have a ground terminal, $V_{SS}$; a power terminal, $V_{DD}$ or $V_{CC}$; and a bidirectional serial input-output (I/O) terminal adapted for receiving and transmitting the SCIO.

In addition, hardwired address selection terminals, for example but not limited to, A0 and A1 may be used when more then three terminals are available on the integrated circuit package. It is contemplated and within the scope of this disclosure that block address set-up may be performed via software instructions through the SCIO terminal over the single-node data, address and control bus 106. It is also contemplated and within the scope of the present disclosure that a digital device 102 and/or the peripheral device 104 may be packaged in a dual die integrated circuit package wherein the single-node data, address and control bus 106 may be a bond wire (not shown) or other direct die-to-die connection within the integrated circuit package.

Figure 3:
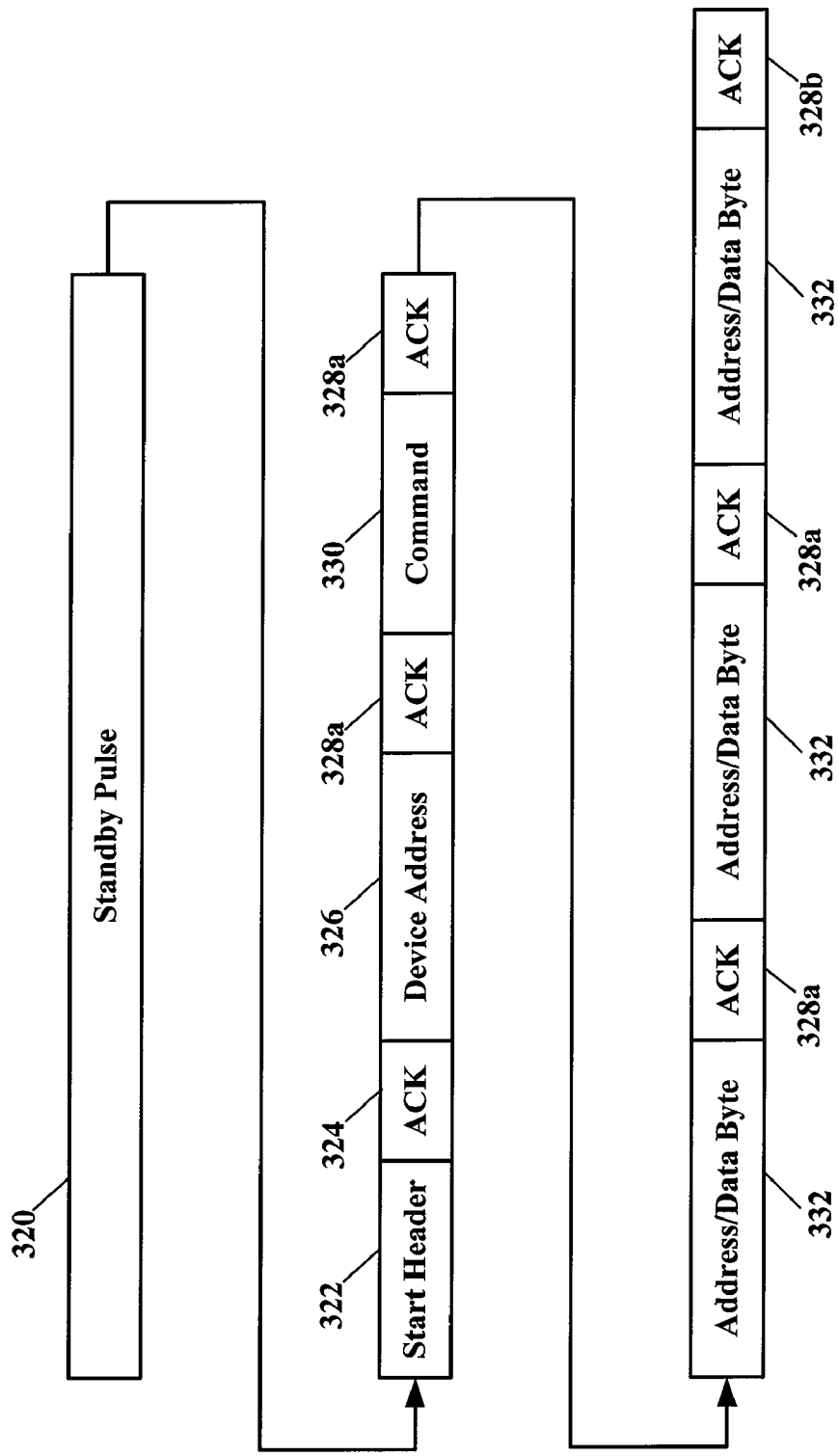
FIG. 3 illustrates a schematic diagram of a command structure for an enhanced single-node protocol for data, address and control operations, according to a specific example embodiment of this disclosure.

Referring to FIG. 3, depicted is a schematic diagram of a command structure for an enhanced single-node protocol for data, address and control operations, according to a specific example embodiment of this disclosure. A standby pulse 320 precedes sending a start header 322 by the master device. An acknowledge sequence 324 follows after the start header 322 has been sent. The acknowledge sequence 324 comprises a master acknowledge (MAK) followed by no slave acknowledge (NoSAK) (see FIG. 9). Next a device address 326 is sent by the master device followed by an acknowledge (ACK) 328a sequence (see FIG. 9). A command 330 is sent by the master device followed by another ACK 328a sequence. Word address and/or data (information) bytes 332 may thereafter be sent by the either the master and/or slave devices if required, e.g., memory write to or data retrieval from a slave peripheral device 104. The ACK 328a sequence occurs after each information byte is sent until the last information byte is sent, then an ACK 328b sequence (see FIG. 9) is sent which indicates completion of the information byte(s) transfer(s).

Figure 4:
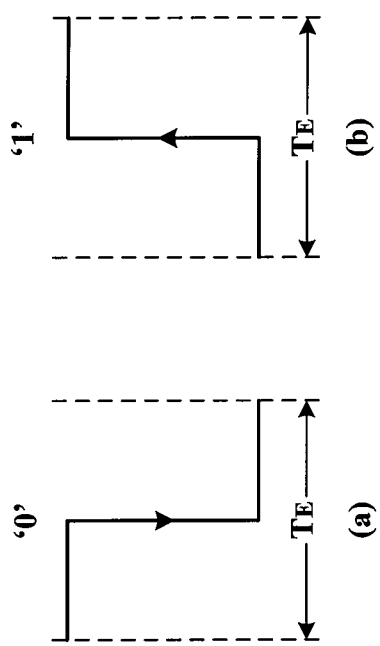
FIG. 4 illustrates schematic timing diagrams of Manchester encoding of serial digital signals over the single-node data, address and control bus of FIG. 1.

Referring to FIG. 4, depicted are schematic timing diagrams of Manchester encoding of serial digital signals over the single-node data, address and control bus of FIG. 1. The single-node data, address and control bus 106 may operate as a bidirectional single-node bus and data transmission protocol.

A device that sends data onto the bus 106 may be defined as a transmitter, and a device receiving data as a receiver. The bus 106 is controlled by the master, and the master determines a clock period, control bus access and may initiate all operations between the master and slave devices. Typically, the digital device 102 will be the master and the peripheral device 104 will be the slave. Both master and slave may operate as transmitter or receiver, but the master determines which operational mode (transmit or receive) is activated for each device. Multiple devices may be connected to the bus 106, though only one will serve as the master.

The transmitter will change the voltage levels of SCIO on the single-node bus 106 during a bit period, $T_E$, preferably at substantially the middle of the bit period, $T_E$. The SCIO on the bus 106 is the only I/O signal required since both the serial clock and data are embedded together through Manchester encoding. In Manchester encoding, each bit consists of a mandatory edge in substantially the middle of the bit period, $T_E$. The direction of this edge determines the logic value of the bit. A rising edge indicates a logic "1" and a failing edge indicates a logic "0."

Examples for Manchester encoding are: (a) for a logic "0" the single-node bus voltage level will go from a high, e.g., Vdd, to a low, e.g., Vss (falling edge), and (b) for a logic "1" the single-node bus voltage level will go from a low, e.g., Vss, to a high, e.g., Vdd (rising edge). The receiver will sense the single-node bus voltage level changes and thereby decode the rising and falling edges of the SCIO data stream into logic 1s and logic 0s, respectively, and will also synchronize its internal clock with the bit period, $T_E$, of the transmitter.

Figure 5:
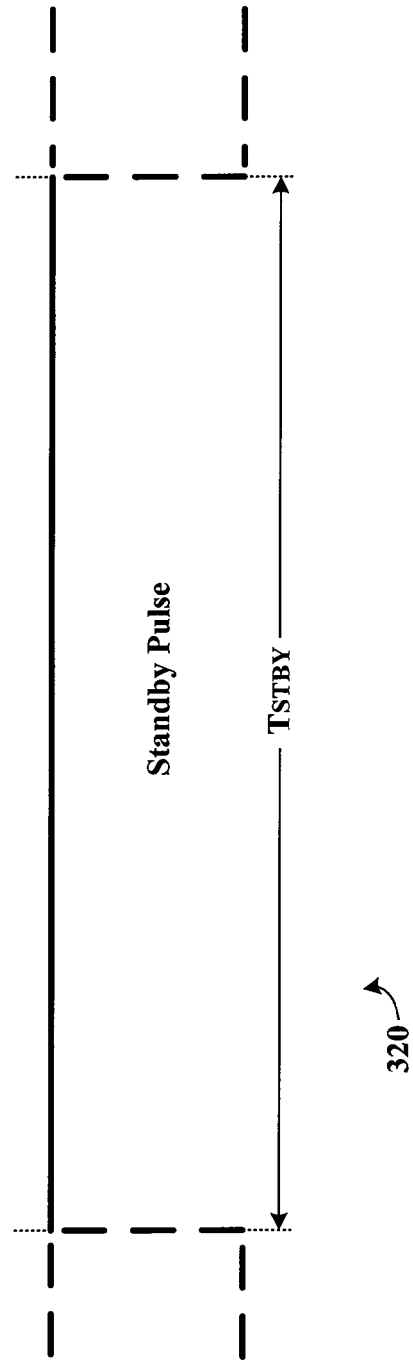
FIG. 5 illustrates a schematic timing diagram of a standby pulse for the enhanced single-node protocol shown in FIG. 3.

Referring to FIG. 5, depicted is a schematic timing diagram of a standby pulse for the enhanced single-node protocol shown in FIG. 3. The standby pulse 320 is generated by the bus 106 being driven by the master device to a logic high (1) pulse having a time duration of $T_{STBY}$, e.g., 600 microseconds minimum. The standby pulse 320 indicates a reset condition to all devices connected to the bus 106, and puts these devices in a standby mode, ready for reception of a new command beginning with the start header 322. The standby pulse 320 is used when selecting a new slave device. The standby pulse 320 may also be used to prematurely terminate a command.

Figure 6:
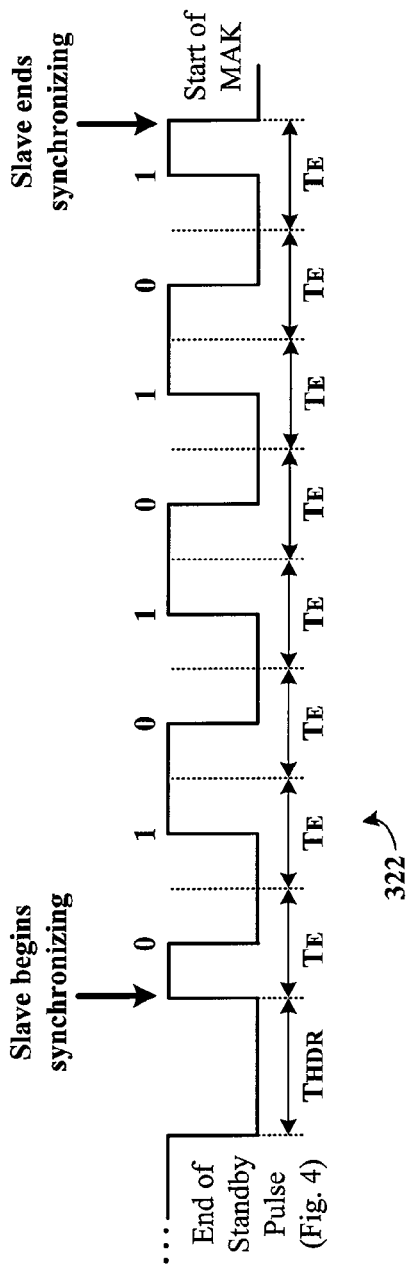
FIG. 6 illustrates a schematic timing diagram of a start header for the enhanced single-node protocol shown in FIG. 3.

Referring to FIG. 6, depicted is a schematic timing diagram of a start header for the enhanced single-node protocol shown in FIG. 3. The start header 322 begins when a logic level low (0) pulse is asserted by the device master on the bus 106. The logic level 0 pulse on the bus 106 remains low for a time duration of $T_{HDR}$, e.g., about 5 microseconds. The time duration, $T_{HDR}$, allows for device oscillator start-up, etc., thereafter the start header 322 may consist of, for example but not limited to, an 8-bit binary code (e.g., 01010101) being generated from the transmitting device. At the first bus 106 level transition to a logic 1, the slave device begins synchronization (e.g., internal clock timing synchronization) until the last transition (after 01010101 is generated) where the slave device ends synchronization. The start header 322 is always the first byte transmitted for any given command. After the bits (e.g., byte) of the start header 322 have been sent, an acknowledge sequence is performed. Just for this specific sequence, only the MAK is asserted and there is no SAK (slave acknowledge), e.g., a "NoSAK" occurring after the eight transmitted bits of the start header 322 have completed. See description of FIG. 9 below.

Figure 7:
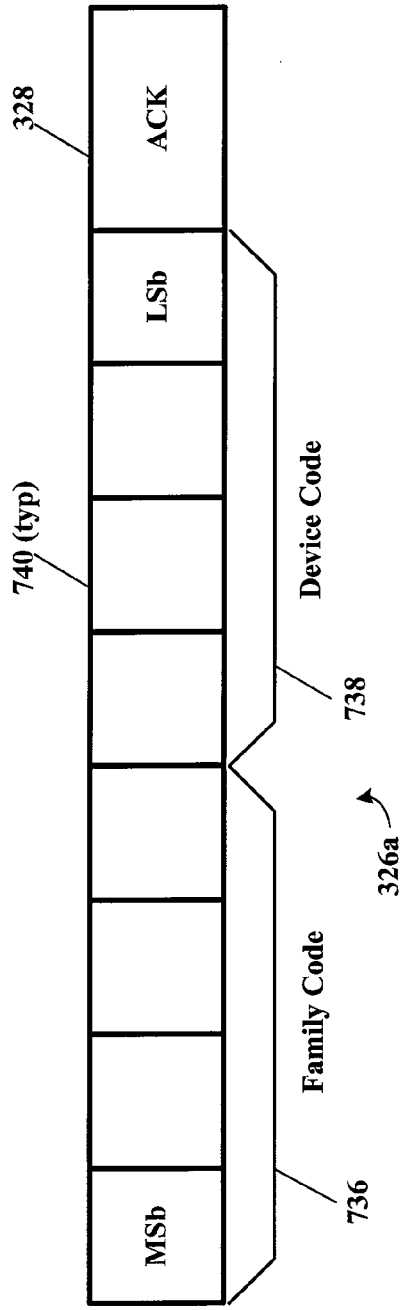
FIG. 7 illustrates a schematic diagram of an 8-bit device addressing structure for the enhanced single-node protocol shown in FIG. 3.
Figure 8:
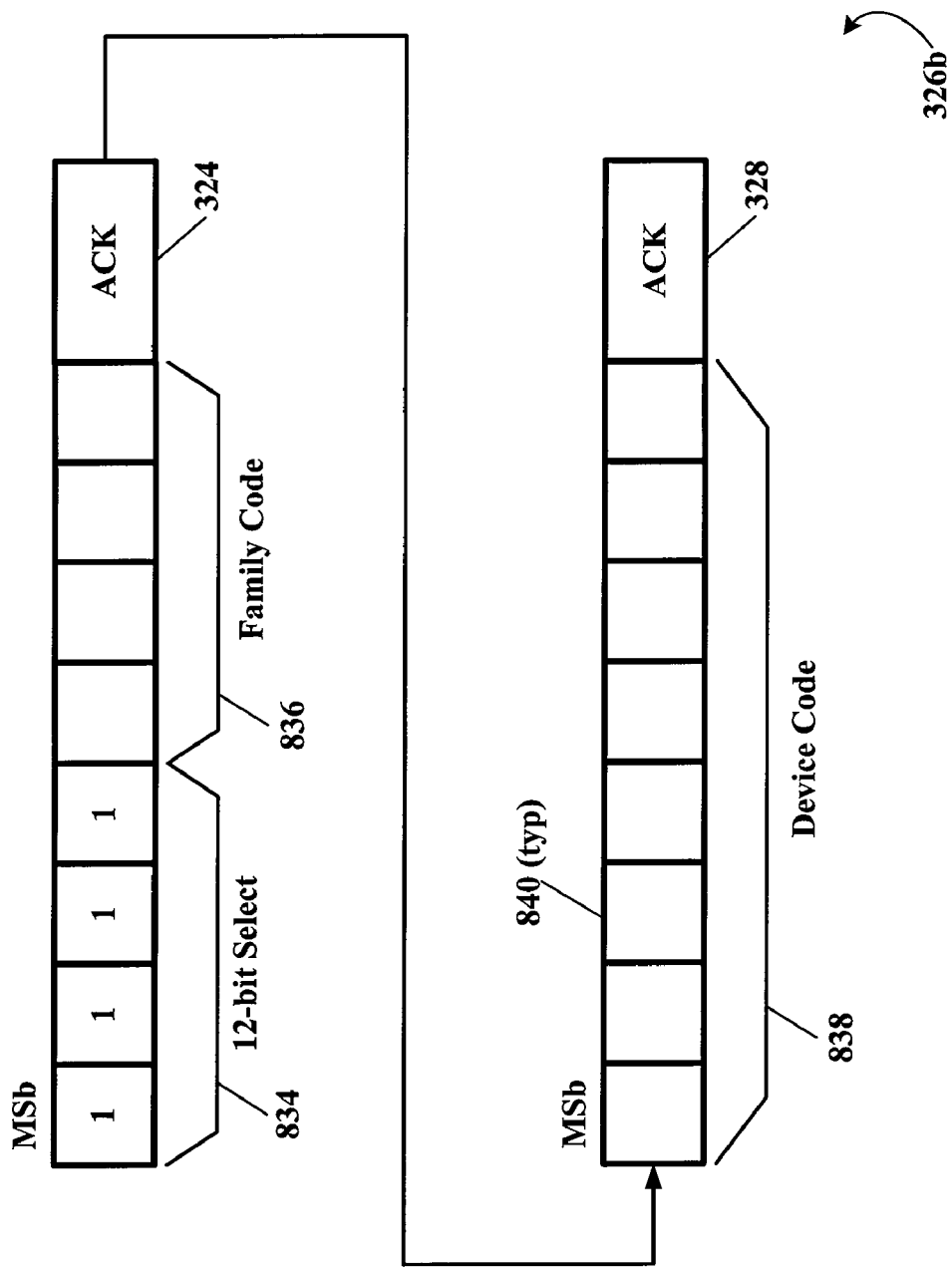
FIG. 8 illustrates a schematic diagram of a 12-bit device addressing structure for the enhanced single-node protocol shown in FIG. 3.

Referring to FIGS. 7 and 8, depicted are schematic diagrams of an 8-bit device addressing structure and a 12-bit device addressing structure, respectively, for the enhanced single-node protocol shown in FIG. 3. Following the start header 322, the device address 326 is sent. The device address 326 may consist of either one or two bytes depending on whether 8-bit (FIG. 7) or 12-bit (FIG. 8) device addressing is supported, respectively. The purpose of the device address 326 is to select a specific slave device connected on the bus 106. Therefore, every slave device connected to the bus 106 must have a unique device address 326, otherwise bus conflicts will occur and operation will be undefined. All ones in the 12-bit select 834 indicates 12-bit addressing of the device.

The family codes 736 and 836 are 4-bit values included in the device addresses 326a and 326b, respectively, and indicate the family in which the peripheral devices 104 reside. Examples of peripheral device families include, but are not limited to, memory devices, temperature sensors, programmable gain amplifiers, I/O port expanders, analog-to-digital converters (ADC) and digital-to-analog converters (DAC).

The device codes 738 and 838 are 4-bit and 8-bit values, respectively, depending on whether 8-bit (FIG. 7) or 12-bit (FIG. 8) device addressing is supported. The device codes 738 and 838 are used to differentiate devices with the same family codes. It is contemplated and with the scope of this disclosure that some devices may support programmable device codes bits 740 and 840, whereas on other devices these bits may be fixed at the time of manufacture of the device. The 4-bit device code 738 allows up to 16 devices from the same family on the bus 106. The 8-bit device code 838 allows up to 256 devices from the same family on the bus 106.

Figure 9:
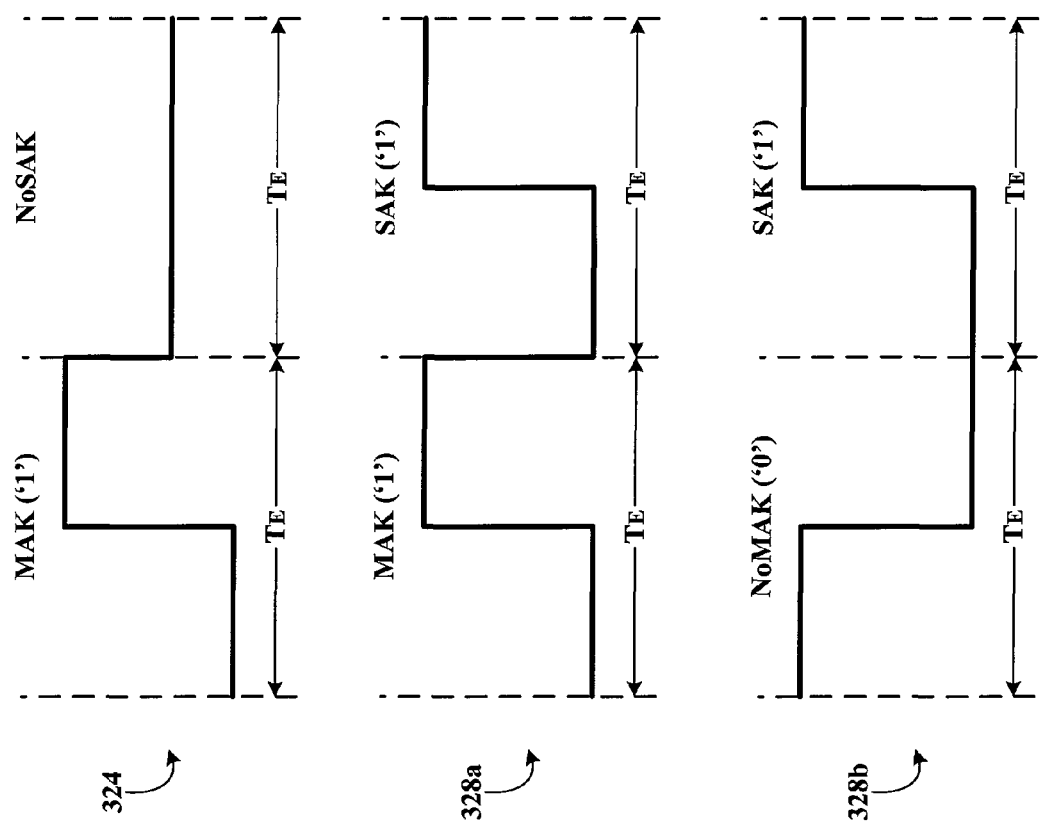
FIG. 9 illustrates schematic timing diagrams of master and slave acknowledge sequences for the enhanced single-node protocol shown in FIG. 3.

Referring to FIG. 9, depicted are schematic timing diagrams of master and slave acknowledge sequences for the enhanced single-node protocol shown in FIG. 3.

The acknowledge sequence, ACK 324, of FIG. 3 is comprised of two bit periods, $T_E$, the first bit period is for the MAK, at logic 1, and the second bit period is for NoSAK, NoSak appears as no edge at all, e.g., no device transmitting, a non-asserted state (tri-state output drive). The acknowledge sequence, ACK 324, is used to indicate completion of the start header 322 and completion of the first byte of a 12-bit device address (see FIG. 8).

The acknowledge sequence, ACK 328a, of FIG. 3 is comprised of two bits, the first bit is for MAK, logic 1, and the second bit is for SAK, always a logic 1. The acknowledge sequence, ACK 328a, is used to indicate continuation of an operation, as well as to confirm reception of a byte.

The acknowledge sequence, ACK 328b, of FIG. 3 is comprised of two bits, the first bit is for NoMAK, logic 0, and the second bit is for SAK, always a logic 1. The acknowledge sequence, ACK 328b, is used to indicate termination of an operation, as well as to confirm reception of a byte.

However no slave device will respond with a SAK until a specific slave device has been selected. This is required in order to avoid possible bus collision due to multiple slave devices transmitting at the same time. Referring back to FIG. 7, for 8-bit addressing, there will be no SAK occurring after the start header 322 only. Referring back to FIG. 8, for 12-bit addressing, there will be no SAKs occurring after both the start header 322 and the most significant byte (MSB) 834+ 836 of the device address 326b.

The MAK or NoMAK bit occurs as the first bit of every acknowledge sequence, ACK 324 and ACK 328. It is always sent by the master device, regardless of which device (master or slave) transmitted the preceding byte. A MAK is sent as a logic "1" and a NoMAK as a logic "0." Sending a MAK during the acknowledge sequence, ACK 328a, indicates that the current operation is to be continued. This means that more data is to be sent by the device acting as transmitter. A NoMAK indicates that the current operation is to be terminated immediately following completion of the acknowledge sequence, ACK 328b.

The SAK bit occurs as the second bit of the acknowledge sequence, ACK 328, and is sent strictly by the slave device regardless of which device transmitted the preceding byte. The SAK bit is sent as a logic "1" and the absence of a SAK bit (NoSAK) appears as no edge at all, i.e., no device transmitting. If after sending a device address 326, no SAK bit is received from the addressed slave device, then an error may have occurred. When an absence of a SAK bit occurs the master device may perform a standby pulse 320 and then may begin the desired command again.

A non-occurrence of a SAK bit may also be used for determining the slave devices that are connected to the bus 106 (FIG. 1). The bus master 102 may send out a plurality of interrogation commands, each one of the plurality of interrogation commands has a unique address associated therewith. If a SAK bit is received after the interrogation command, then there is a slave device 104 connected to the bus 106 having the address of that interrogation command. However, if there is an absense of a SAK bit (NoSAK) then there is no slave device 104 connected to the bus 106 having the address of the interrogation command resulting in the NoSAK.

Figure 10:
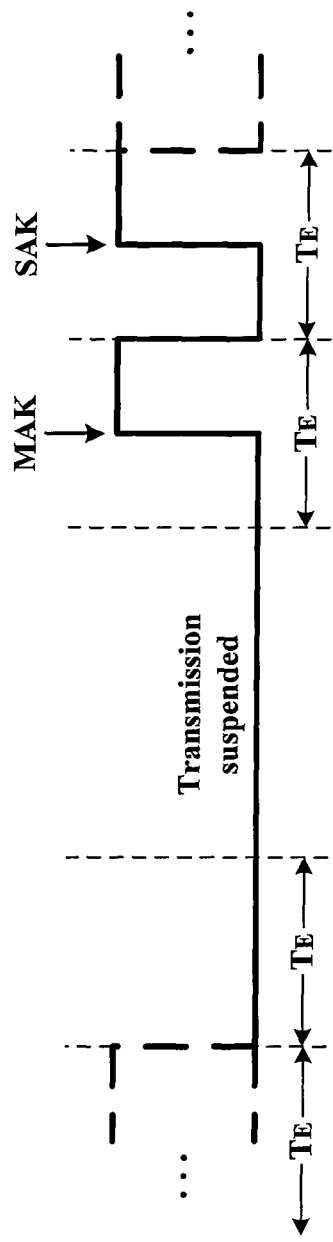
FIG. 10 illustrates a schematic timing diagram of a hold pulse, master acknowledge and slave acknowledge for the enhanced single-node protocol shown in FIG. 3.

Referring to FIG. 10, depicted is a schematic timing diagram of a hold pulse, master acknowledge and slave acknowledge for the enhanced single-node protocol shown in FIG. 3. The hold pulse 1050 is optional and suspends operation of the currently addressed slave device when asserted. The hold pulse 1050 allows the master device to service interrupts, etc. The master device brings SCIO to a logic low (0) on the bus 106 at the beginning of the next MAK bit period and continues to keep SCIO low while in hold, for a minimum of one bit period, $T_E$. This will initiate a hold on the addressed slave device. To bring the most recently addressed slave device out of a hold condition, the hold pulse 1050 is released (SCIO back to a logic high (1)) and then within the appropriate bit periods, $T_E$, first a MAK and then a SAK, will be asserted. Thereafter normal data/address transmission resumes. The hold pulse 1050 cannot occur during a start header 322.

Figure 11:
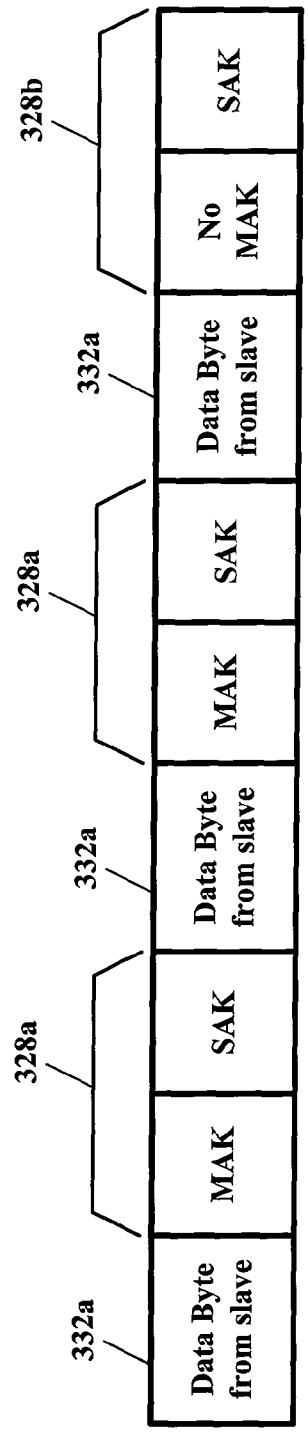
FIG. 11 illustrates a schematic diagram of a multi-byte read sequence for the enhanced single-node protocol shown in FIG. 3.

FIG. 11 illustrates a schematic diagram of a multi-byte read sequence for the enhanced single-node protocol shown in FIG. 3. After each data byte from the slave device an acknowledge sequence is sent. When another data byte is to be sent (read) from the slave device, a MAK and SAK sequence occur. When no further data byte is desired to be sent (read) from the slave device, a NoMAK and SAK sequence occur. The NoMAK response from the master device ends the transmission of data from the device slave to the master device.

Figure 12:
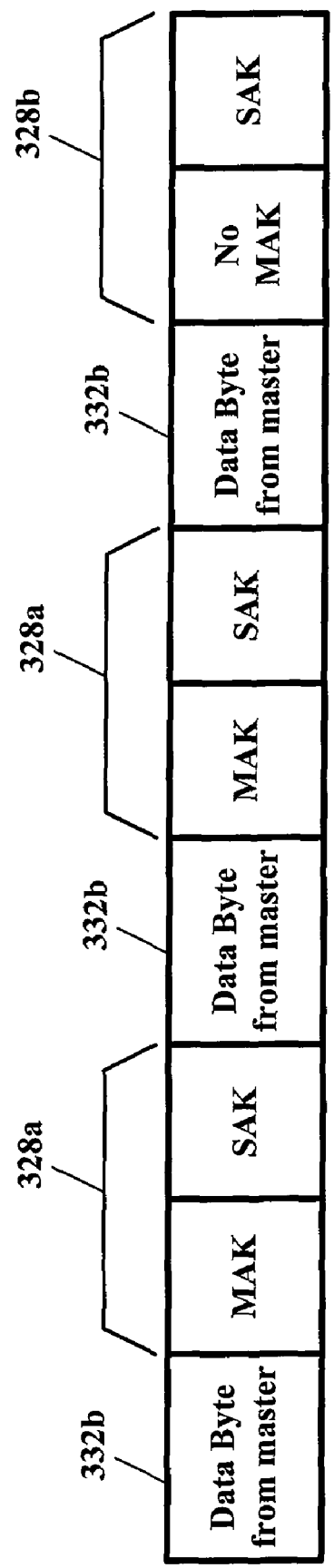
FIG. 12 illustrates a schematic diagram of a multi-byte write sequence for the enhanced single-node protocol shown in FIG. 3.

FIG. 12 illustrates a schematic diagram of a multi-byte write sequence for the enhanced single-node protocol shown in FIG. 3. After each data byte to the slave device an acknowledge sequence is sent. When another data byte is to be written to the slave device, a MAK and SAK sequence occur. When no further data byte is to be written to the slave device, a NoMAK and SAK sequence occur. The NoMAK response from the master device ends the transmission of data from the master device to the slave device.

It is contemplated and within the scope of this disclosure that read and/or write sequences may also comprise error checking parity bits, and/or error checking and correcting bits.

Slave devices have a standby mode during which time the slave device is waiting to begin a new command. The standby mode will be entered upon the following conditions: (a) A NoMAK followed by a SAK (i.e., valid termination of a command), or (b) reception of a standby pulse 320. A high-to-low transition of the SCIO will cause the slave device(s) to exit standby and prepare the device for reception of the start header 322. The standby mode may also be used to provide a low-power mode of operation by only activating the slave device(s) at the beginning of the first low pulse of the start header 322.

Slave devices have a device idle mode during which all serial data is ignored until a standby pulse 320 occurs. The idle mode will be entered upon the following conditions: (a) invalid device address, (b) invalid command byte, and/or (c) missed edge transition, except when the slave device enters the standby mode, as described hereinabove.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An enhanced single-node protocol for data, address and control operations between digital devices, said protocol comprising the steps of:

providing a master device having a bidirectional serial clock, and data and control input-output (SCIO) terminal;

providing at least one slave device having a bidirectional SCIO terminal, wherein the master device SCIO terminal and the at least one slave device SCIO terminal are coupled together;

generating a standby pulse from the master device SCIO terminal;

generating a start header from the master device SCIO terminal;

generating a master acknowledge from the master device SCIO terminal;

generating a device address from the master device SCIO terminal;

generating the master acknowledge from master device SCIO terminal;

generating a slave acknowledge from the slave device SCIO terminal;

generating a command from the master device SCIO terminal;

generating the master acknowledge from the master device SCIO terminal;

generating the slave acknowledge from the slave device SCIO terminal;

generating an information byte from the master device SCIO terminal when sending information to the slave device SCIO terminal;

generating an information byte from the slave device SCIO terminal when sending information to the master device SCIO terminal;

generating a termination master acknowledge from the master device SCIO terminal; and generating the slave acknowledge from the slave device SCIO terminal.

2. The enhanced single-node protocol according to claim 1, wherein each step of generating an information byte further comprises the steps of generating a plurality of information bytes wherein the master acknowledge and the slave acknowledge are generated between each of the plurality of information bytes until the termination master acknowledge from the master device SCIO terminal and the slave acknowledge from the slave device SCIO terminal are generated.

3. The enhanced single-node protocol according to claim 2, wherein the master acknowledge represents a first logic, the slave acknowledge represents the first logic, and the termination master acknowledge represents a second logic.

4. The enhanced single-node protocol according to claim 3, wherein the first logic is a logic 1 and the second logic is a logic 0.

5. The enhanced single-node protocol according to claim 3, wherein the first logic is a logic 0 and the second logic is a logic 1.

6. The enhanced single-node protocol according to claim 1, wherein the master and slave devices use a serial transfer signal protocol.

7. The enhanced single-node protocol according to claim 6, wherein the serial transfer signal protocol is a Manchester signal protocol.

8. The enhanced single-node protocol according to claim 6, wherein the serial transfer signal protocol is a selected from the group consisting of non-return to zero (NRZ), pulse position modulation (PPM), frequency shift keying (FSK), phase shift keying (PSK), and amplitude shift keying (ASK).

9. The enhanced single-node protocol according to claim 1, wherein the standby pulse is at least 600 microseconds.

10. The enhanced single-node protocol according to claim 1, wherein the start header comprises at least eight (8) bits.

11. The enhanced single-node protocol according to claim 10, wherein the start header comprises an eight (8) bit pattern of 01010101.

12. The enhanced single-node protocol according to claim 1, wherein the device address comprises a family code and a device code.

13. The enhanced single-node protocol according to claim 12, wherein the family code is four (4) bits and the device code is four (4) bits.

14. The enhanced single-node protocol according to claim 12, wherein the family code is four (4) bits and the device code is eight (8) bits.

15. The enhanced single-node protocol according to claim 12, wherein the device address comprises two bytes,
a first byte of the device address comprises a select header of four (4) bits having a bit pattern of 1111 and a family code of four (4) bits; and
a second byte of the device address comprises a device code of eight (8) bits.

16. The enhanced single-node protocol according to claim 1, wherein the command comprises eight (8) bits.

17. The enhanced single-node protocol according to claim 1, wherein the information byte is selected from the group consisting of address and data.

18. The enhanced single-node protocol according to claim 1, further comprising the step of generating a hold pulse from the master device SCIO terminal.

19. The enhanced single-node protocol according to claim 18, wherein the hold pulse suspends operation of a currently addressed slave.

20. The enhanced single-node protocol according to claim 18, wherein the currently addressed slave comes out of a hold condition when the hold pulse from the master device SCIO terminal goes from a logic 0 to a logic 1, the master acknowledge is generated and the slave acknowledge is generated.

21. The enhanced single-node protocol according to claim 1, wherein the master device SCIO terminal is a connection pad on a master device integrated circuit.

22. The enhanced single-node protocol according to claim 21, wherein the master device integrated circuit is enclosed in an integrated circuit package.

23. The enhanced single-node protocol according to claim 22, wherein the master device SCIO terminal is a connection on the master device integrated circuit package.

24. The enhanced single-node protocol according to claim 1, wherein the slave device SCIO terminal is a connection pad on a slave device integrated circuit.

25. The enhanced single-node protocol according to claim 24, wherein the slave device integrated circuit is enclosed in an integrated circuit package.

26. The enhanced single-node protocol according to claim 24, wherein the slave device SCIO terminal is a connection on the slave device integrated circuit package.

27. The enhanced single-node protocol according to claim 1, wherein the master device SCIO terminal and the at least one slave device SCIO terminal are coupled together with a SCIO bus.

28. An enhanced single-node protocol for data, address and control operations between digital devices, said protocol comprising the steps of:
(a) providing a master device having a bidirectional serial clock, and data and control input-output (SCIO) terminal;
(b) providing at least one slave device having a bidirectional SCIO terminal, wherein the master device SCIO terminal and the at least one slave device SCIO terminal are coupled together;
(c) generating a standby pulse from the master device SCIO terminal;
(d) generating a start header from the master device SCIO terminal;
(e) generating a master acknowledge from the master device SCIO terminal;

(f) generating a one of a plurality of device addresses from the master device SCIO terminal;
(g) generating the master acknowledge from master device SCIO terminal;
(h) determining whether a slave acknowledge is generated for the one of the plurality of device addresses, wherein if the slave acknowledge is generated then storing the one of the plurality of device addresses in a slave device table; and
(i) repeating steps (c) through (h) until every one of the plurality of device addresses have been generated.

* * * * *